United States Patent Office 3,306,725
Patented Feb. 28, 1967

3,306,725
METHOD FOR CONTROLLING ANNUAL WEEDS IN TOMATO FIELDS
Enrico Knüsli, Riehen, and Hans Gysin, Basel, Switzerland, assignors to J. R. Geigy A.G., Basel, Switzerland
No Drawing. Filed Dec. 16, 1963, Ser. No. 330,581
Claims priority, application Switzerland, Nov. 5, 1958, 65,809, 65,811, 65,814; Dec. 29, 1958, 67,783
1 Claim. (Cl. 71—2.5)

This patent application is a continuation-in-part of our pending applications Serial No. 848,224 filed October 23, 1959, and of the continuation-in-part of the latter, Serial No. 162,228, filed December 26, 1961, both now abandoned.

The present invention concerns new herbicidal compositions containing new triazine derivatives having valuable herbicidal properties, as well as their use for the inhibition of plant growth.

In one aspect of the invention, it relates to herbicidal compositions containing new compounds of the formula

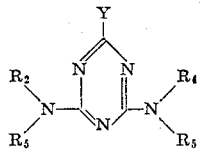

wherein
$R_2$ represents a lower alkoxyalkyl radical,
$R_4$ represents a lower alkyl or lower alkenyl radical,
$R_5$ represents, independently in each occurrence, hydrogen, a lower alkyl or lower alkenyl radical, and
Y represents chlorine or bromine, and methods of employing same.

In the preferred compounds of Formula I, $R_2$ is represented by a lower alkoxyalkyl radical, $R_4$ by a lower alkyl radical, both $R_5$ by hydrogen and Y by chlorine or bromine. The β-lower alkoxy-ethyl and γ-lower alkoxy-propyl radicals are the preferred embodiments of lower alkoxyalkyl radicals.

The new triazines of Formula I have excellent herbicidal properties and are suitable both for the selective killing of weeds among cultivated plants and for the killing of weeds on uncultivated ground such as that of industrial plants, railway or tram lines or paths.

To produce the new compounds of Formula I triazine derivatives of the formula

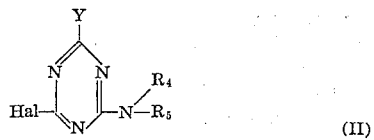

are reacted with one mol of an amine of formula

or triazine derivatives of the formula

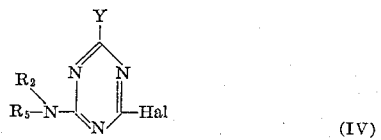

are reacted with one mol of an amine of the formula

all the above reactions being performed in the presence of an acid binding agent. In the above formulae $R_2$, $R_4$, $R_5$ and Y have the meanings given in Formula I, Hal represents chlorine or bromine, and in Formulae II and IV is advantageously the same as Y. For economic reasons, in the starting materials of Formula II, Hal is advantageously chlorine.

Most simply, an excess of the amine to be reacted is used as acid binding agent. In the reactions with triazine derivatives of the Formula II, this excess is advantageously one mole. Also, for example, alkali hydroxides or alkali carbonates can be used as acid binding agents.

Suitable starting materials of the general Formula II are, for example:

2,4-dichloro-6-methylamino-s-triazine,
2,4-dichloro-6-ethylamino-s-triazine,
2,4-dichloro-6-n-propylamino-s-triazine,
2,4-dichloro-6-isopropylamino-s-triazine,
2,4-dichloro-6-n-butylamino-s-triazine,
2,4-dichloro-6-allylamino-s-triazine,
2,4-dichloro-6-methallylamino-s-triazine,
2,4-dichloro-6-dimethylamino-s-triazine,
2,4-dichloro-6-diethylamino-s-triazine,
2,4-dichloro-6-(N-methyl-n-butylamino)-s-triazine,
2,4-dichloro-6-(N-n-butylallylamino)-s-triazine,
2,4-dichloro-6-diallylamino-s-triazine,
2,4-dibromo-6-ethylamino-s-triazine,
2,4-dibromo-6-isopropylamino-s-triazine,
2,4-dibromo-6-allylamino-s-triazine,
2,4-dibromo-6-diethylamino-s-triazine,
2,4-dibromo-6-(N-methyl-allylamino)-s-triazine and
2,4-dibromo-6-diallylamino-s-triazine.

Formula IV embraces, for example, the following compounds:

2,4-dichloro-6-(β-methoxy-ethylamino)-s-triazine,
2,4-dichloro-6-(β-ethoxy-ethylamino)-s-triazine,
2,4-dichloro-6-(γ-methoxypropylamino)-s-triazine,
2,4-dichloro-6-(γ-isopropoxy-propylamino)-s-triazine,
2,4-dichloro-6-(N-methyl-β-methoxy-ethylamino)-s-triazine,
2,4-dichloro-6-(N-ethyl-β-methoxy-ethylamino)-s-triazine,
2,4-dichloro-6-(N-methyl-γ-methoxy-propylamino)-s-triazine,
2,4-dibromo-6-(γ-methoxy-propylamino)-s-triazine and
2,4-dibromo-6-(N-ethyl-γ-isopropylamino)-s-triazine.

The new triazine of Formula I are excellently suitable as active ingredients for weed killers, both for the selective control of weeds among cultivated plants as well as for the total destruction and inhibition of undesired plant growth. By weeds are meant here also undesired cultivated plants, for example, those from a previous crop. The triazines of formula I are also suitable as active ingredients for the attainment of other inhibitory influences on plant growth, in particular defoliation, e.g. of cotton plants, desiccation e.g. of potato plants, also for blossom thinning, prolongation of the harvesting period and storing propensities.

In application the active compounds of Formula I defined above can be used together with an agricultural adjuvant, i.e. in the form of solutions, emulsions, suspensions, pastes, dusts or granules. All forms of application must ensure that the active ingredient is contained in a finely distributable form. Especially, when used for the total destruction of plant growth, early desiccation as well as defoliation, the action can be increased by the use of carriers having a phytotoxic action such as e.g. high boiling mineral fractions; for instance a selective weed killing is generally better attained by using carriers which are inert to plants.

In particular higher boiling organic liquids such as mineral oil fractions, coal tar oils as well as also vegetable and animal oils are used for the production of solutions. To enhance the dissolving of the active component in these liquids, if desired slight amounts of organic liquids having better dissolving powers and generally a lower boiling point can be added i.e. solvents as alcohols, e.g. ethanol or isopropanol, ketones, e.g. butanone, acetone or cyclohexanone, diacetone alcohol, cyclic hydrocarbons, e.g. benzene, xylene or toluene, chlorinated hydrocarbons, e.g. tetrachlorethane or ethylene chloride or mixtures of such substances.

The aqueous forms of aplication are chiefly emulsions and dispersions. The active substances of Formula I are homogenised in water either as such or in one of the solvents named above, with the aid of surface active emulsifying or dispersing agents. Cation active emulsifying agents are, e.g. quaternary ammonium compounds and alkyl polyoxy-ethylene amines such as Katapol PN–430 of Antara Chemicals. Anion active emulsifying and dispersing agents comprise soaps, soft soaps, salts of alkylaryl sulfonates such a Nekal BX–78 of Antara Chemicals, Ninate 402 of Ninol Laboratories Inc., Sellogen HR of Jacques Wolf & Co., Tinovetin B of J. R. Geigy A.G., salts of fatty alcohol sulfonates such as Duponol L 144–WDG of E. I. du Pont de Nemours & Co., salts of sulfonates of vegetable or animal oils, and complex sulfonates such as Emcol H–A, H–B and H–C of Emulsol Chemical Corp. Nonionic emulsifying agents are, e.g. polyethylene glycol ethers of alkylphenols and other polyethers such as Triton X–100 of Rohm & Haas Co., Agrimul 70A and 70B of Nopco Chemicals Co., polyethylene glycol esters of fatty acids such as Nonisol 100 and Nonisol 200 of Geigy Chemical Corp. and Emulsan O and Emulsan K of Reilly-Whiteman-Walton Co., polyoxyethylene sorbitan esters of fatty acids used together with corresponding sorbitan esters such as Tween 60 together with Span 60 of Atlas Powder Co. Anionic agents are used in many cases advantageously in combination with nonionic agents or use is made of commercial blends of anionic and nonionic agents such as Toximul 500 of Ninol Laboratories, Agrimul GA of Nopco Chemical Co., Emcol H 400, H 500, H 600, H 700 or H 800 of Emulsol Chemical Corp., HS–31 Emulsifier of Thompson Chemicals Corp. or T–H Emulsifiers of Thompson-Hayward Chemical Co. Liquid or pasty concentrates suitable for dilution with water comprises a herbicidal substance according to this aspect of the invention, an emulsifying or dispersing agent and, if desired, a solvent as mentioned above.

Dusts and sprinkling agents can be produced by mixing or milling the active ingredient with a solid carrier. Such carriers are: talcum, diatomaceous earth, kaolin, bentonite, calcium carbonate, tricalcium phosphate, sand, or also sawdust, ground cork, and other materials of vegetable origin. On the other hand, the carirers can also be impregnated with solutions of the active ingredients in a volatile solvent and evaporating the latter. By the addition of surface active agents, e.g. the emulsifying agents mentioned above, and protective colloids, e.g. sulphite waste liquor, pulverulent preparations and pastes can be made suspendable in water and used as sprays.

The various forms for application can be more closely adapted to the intended use in the usual way by the addition of substances which improve or decrease the distribution and penetration into the ground depending on the depth of roots of the weeds to be destroyed. The biological effect can be widened by the addition of substances having bactericidal or fungicidal properties, for example, for the attainment of a general earth sterilisation or, in selective weed kililng, for the protection of cultivated plants from other injurious organisms. Substances which also influence plant growth, such as, e.g. 3-amino-1,2,4-triazole to accelerate the onset of action, or. e.g. salts of $\alpha,\alpha$-dichloropropionic acid to widen the range of herbicidal action, may possibly be desirable. A combination with fertilisers may be labour saving and can favour the action of the herbicide.

The amounts of active ingredient necessary per acre vary in selective weed killing dependent on the sensitivity of the ground, between about 0.25 and 10 lbs. per acre time of application, climatic conditions and the condition of theg round, between about 0.25 and 10 lbs. per acre (2.5–100 g. per 100 sq. metres), whilst for the complete elimination of plant growth generally about 5–20 lbs. per acre (50–200 g. per 100 sq. metres) should be used. In certain cases, however, the above amounts can also be exceeded.

The following examples illustrate the production of active ingredients according to this first aspect of the invention, as well as the application of said active ingredients. Parts are always given as parts by weight and the temperatures are in degrees centigrade.

*Example 1*

46 parts of cyanuric chloride are dissolved in 300 parts of chlorobenzene. Then, at —15° to —5°, first 11 parts of ethylamine dissolved in 22 parts of water and then 10 parts of sodium hydroxide dissolved in 40 parts of water are added dropwise. The whole is stirred until the reaction mixture has a neutral reaction, any traces of precipitated 2-chloro-4,6-bis-ethylamino-s-triazine are removed and then, at room temperature, 23 parts of $\gamma$-methoxypropylamine in 46 parts of water and afterwards 10 parts of sodium hydroxide in 40 parts of water are added. The whole is stirred at 40–50° until the reaction mixture has a neutral reaction. The chlorobenzene is eliminated by steam distillation whereupon the difficultly soluble 2-chloro-4-ethylamino-6-$\gamma$-methoxy-propylamino-s-triazine can be filtered off under suction and recrystallised. M.P. 157–158°.

The two primary amines can also be added in reverse order.

The auxiliary solvent named, chlorobenzene, can be replaced by similar solvents such as benzene and toluene. It is also possible, however, to prepare a finely granular aqueous suspension of cyanuric chloride without such an auxiliary solvent.

If, instead of ethylamine, 14 parts of isopropylamine are used, then 2-chloro-4-isopropylamino-6-($\gamma$-methoxy-propylamino)-s-triazine (M.P. 112–114°) is obtained.

The following compounds can be produced, for example, in an analogous manner:

2-chloro-4-ethylamino-6-($\beta$-methoxy-ethylamino)-s-triazine, M.P. 166–167°,
2-chloro-4-isopropylamino-6-($\beta$-methoxy-ethylamino)-s-triazine, M.P. 94–96°,
2-chloro-4-ethylamino-6-($\beta$-ethoxy-ethylamino)-s-triazine, M.P. 156–158°,
2-chloro-4-isopropylamino-6-($\beta$-ethoxy-ethylamino)-s-triazine, M.P. 71–72°,
2-chloro-4-ethylamino-6-($\gamma$-isopropoxy-propylamino)-s-triazine, M.P. 144–146°,
2-chloro-4-isopropylamino-6-($\gamma$-isopropoxy-propylamino)-s-triazine, M.P. 99–100.5°,
2-chloro-4-methylamino-6-($\beta$-methoxy-ethylamino)-s-triazine,
2-bromo-4-ethylamino-6-($\beta$-ethoxy-ethylamino)-s-triazine,
2-bromo-4-isopropylamino-6-($\beta$-methoxy-ethylamino)-s-triazine,
2-bromo-4-isopropylamino-6-($\gamma$-methoxy-propylamino)-s-triazine,
2-bromo-4-allylamino-6-($\beta$-ethoxy-ethylamino)-s-triazine,
2-bromo-4-diethylamino-6-($\gamma$-methoxy-propylamino)-s-triazine,
2-chloro-4-n-propylamino-6-($\gamma$-methoxy-propylamino)-s-triazine, 2-chloro-4-allylamino-6-(γ-methoxy-propylamino)-s-triazine,
2-chloro-4-n-butylamino-6-(β-methoxy-ethylamino)-s-triazine,
2-chloro-4-ethylamino-6-(δ-methoxy-butylamino)-s-triazine,
2-chloro-4-diethylamino-6-(β-methoxy-ethylamino)-s-triazine,
2-chloro-4-diethylamino-6-(γ-methoxy-propylamino)-s-triazine,
2-chloro-4-methallylamino-6-(γ-methoxy-propylamino)-s-triazine,
2-chloro-4-(N-ethyl-allylamino)-6-(β-methoxy-ethylamino)-s-triazine,
2-chloro-4-diallylamino-6-(γ-methoxy-propylamino)-s-triazine,
2-chloro-4-ethylamino-6-(N-ethyl-γ-methoxy-propylamino)-s-triazine,
2-chloro-4-isopropylamino-6-(N-methyl-β-methoxy-ethylamino)-s-triazine.

Example 2

10 parts of active ingredient, 2-chloro-4-ethylamino-6-(γ-methoxy-propylamino)-s-triazine and 90 parts of talcum are ground in a ball mill. (Alternatively a pin beater mill or another suitable mill can be used.) The mixture obtained serves as a dust.

Example 3

20 parts of active ingredient, 2-chloro-4-isopropylamino-6-(γ-methoxy-propylamino)-s-triazine, are dissolved in a mixture of 48 parts of diacetone alcohol, 16 parts of xylene and 16 parts of an anhydrous polyethylene glycol ester of higher fatty acids. This concentrate can be diluted with water to form emulsions of any concentration desired.

Example 4

50–80 parts of active ingredient, 2-chloro-4-ethylamino-6-(β-methoxy-ethylamino)-s-triazine, are mixed with 2–5 parts of a wetting agent i.e. a sulphuric acid ester of an alkyl polyethylene glycol ether, 1–5 parts of a protective colloid, e.g. sulphite waste liquor and 14–44 parts of an inert solid carrier i.e. kaolin, and the mixture is then finely milled in a suitable mill. The wettable powder obtained is stirred up with water and produces very stable suspensions. Similar results can be had if bentonite, chalk or kieselguhr is employed in place of kaolin.

Example 5

10 parts of 2-chloro-4-isopropylamino-6-(β-methoxy-ethylamino)-s-triazine are dissolved in 60–80 parts of a high boiling organic liquid i.e. coal tar oil to which 30–10 parts of xylene has been added. It can be used as a spray. In place of coal tar oil, diesel oil or spindle oil can be employed.

Example 6

5–10 parts of 2-chloro-4-isopropyl-amino-6-(γ-methoxypropylamino)-s-triazine are mixed and milled with 95–90 parts of calcium carbonate (=ground limestone). The product can be used as a sprinkling agent.

Example 7

95 parts of a granular carrier, i.e. sand, are moistened with 1–5 parts of water and then 5 parts of 2-chloro-4-isopropylamino-6-(γ-methoxy-propylamino) - s- triazine are mixed in.

A greater amount, e.g. 100–900 parts of a possibly water soluble fertiliser such as e.g. ammonium sulfate or urea can be mixed with the above mixture or with one containing more active ingredient, e.g. 10 parts of active ingredient and 90 parts of calcium carbonate. The granulates obtained can be sprinkled.

Example 8

50 parts of 2-chloro-4-isopropylamino-6-(β-methoxy-ethylamino)-s-triazine are added to 45 parts of xylene and the whole is combined with 5 parts of Toximul 500. A concentrate for the preparation of emulsions which in water can be emulsified in any ratio desired, is obtained.

Example 9

Between May 19 and 22, 1959, various types of cultivated plants were either sown or planted in slightly marly sandy soil containing little organic matter (not fertilised). On June 24 they were treated by portable spray with 0.2 litre per sq. m. of emulsions of the active substances to be tested. Each plot of cultivated plants, 7.5 sq. m., was treated with one concentration of active substance so that each concentration could be tested. The concentrations used were 0.05%, 0.125%, 0.25% and 0.5% corresponding respectively to 0.1 g., 0.25 g., 0.5 g. and 1 g. per sq. m. (about 0.9, 2.2, 4.5 and 9 lbs. per acre).

On evaluating the results on July 21, 85% of the annual weeds were killed in the plots treated with 0.25 g. per sq. m. of 2-chloro-4-ethylamino-6-(γ-methoxy-propylamino)-s-triazine (suspension prepared from 50% wettable powder), whilst kohlrabi, gladioli, corn, mustard (25 cm.), peas (10 cm.) were not damaged. In the plots treated with 0.5 g. per sq. m., 99% of the annual weeds were killed and corn, and flax were still undamaged. Corn was even not affected by the highest concentration.

Also, 100% destruction of annual weeds was attained at the same time in the plots treated with lowest concentration of 2-chloro-4-isopropylamino-6-(γ-methoxy-propylamino)-s-triazine (suspension prepared from 50% wettable powder) whilst tomatoes, savoy cabbage, kohlrabi, gladioli and corn were not damaged. Corn was even not damaged by the highest concentration.

During the test period, 55.3 mm. of rain were recorded, mostly towards the end of the time. The plots were sprayed when no rain fell.

A second aspect of the invention relates to herbicidal compositions containing new compounds of the formula

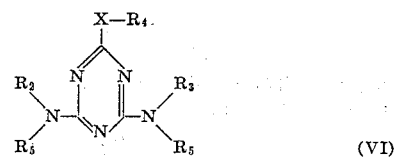

wherein $R_2$ represents a lower alkoxyalkyl radical,
$R_3$ represents a lower alkyl, lower alkenyl or lower alkoxyalkyl radical,
$R_4$ represents a lower alkyl or lower alkenyl radical,
$R_5$ represents, independently in each occurrence, hydrogen, a lower alkyl or lower alkenyl radical, and
X represents oxygen or sulphur, and methods of employing same.

The most valuable compounds of the Formula VI have a lower alkoxy alkyl radical as $R_2$, a lower alkyl or alkoxyalkyl radical as $R_3$, a lower alkyl radical as $R_4$, hydrogen atoms as both $R_5$ and oxygen or sulphur as X. The β-lower-alkoxy-ethyl and γ-lower alkoxy-propyl radicals are the preferred embodiments of lower alkoxyalkyl radicals.

Compounds of Formula VI have excellent herbicidal properties and are suitable both for the selective killing of weeds among cultivated plants and for the killing of weeds on uncultivated ground such as that of industrial plants, tram lines, paths or railways.

To produce the new compounds of Formula VI triazine derivatives of the formula

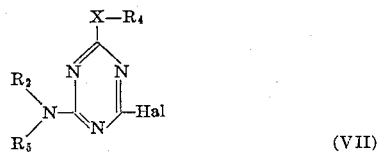

are reacted with one mol of an amine of the formula

or triazine derivatives of the formula

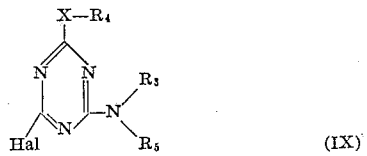

are reacted with one mol of an amine of the formula

all the above reactions being performed in the presence of an acid binding agent. In the above formula $R_2$, $R_3$, $R_4$, $R_5$ and X have the meanings given in Formula VI. Hal represents chlorine or bromine. For economic reasons, in the starting materials of Formula VII, Hal is advantageously chlorine.

Most simply, an excess of the amine to be reacted is used as acid binding agent. In the reactions with triazines of the Formula IX this excess is advantageously one mol. However the amount of one mole can be exceeded if desired. Also for example, alkali hydroxides or alkali carbonates can be used as acid binding agents.

Compounds of the Formula VI are also obtained by reacting a triazine derivative of the formula

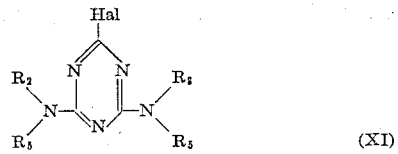

with an alkali metal compound of an alcohol or mercaptan of the formula

In the above formulae, Hal, $R_2$, $R_3$, $R_4$ and $R_5$ have the meanings given to Formula VI.

The reactions can be performed, for example in an excess of the alcohol or mercaptan to be reacted at a raised temperature, for example at the boiling temperature of such alcohol or mercaptan. Also, however, alkali alcoholates or mercaptides of the Formula XII can be reacted in suitable inert organic solvents such as, e.g. hydrocarbons of the benzene series, with the triazine compounds of the Formula XI.

Finally compounds of the Formula VI in which X is sulphur can also be produced by reacting alkali metal salts of triazine derivatives of the formula

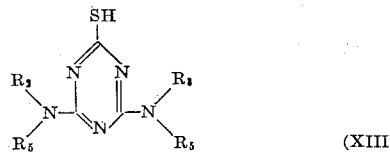

with reactive esters of low molecular alkanols or alkenols, in particular with alkyl or alkenyl halides or dialkyl sulphates. In the formula given above, $R_2$, $R_3$ and $R_5$ have the meanings given under Formula VI.

The following triazine derivatives are examples of starting materials of the Formula VII:
2 - chloro - 4-methoxy-6-($\beta$-methoxy-ethylamino)-s-triazine, 2-chloro-4-methoxy-6-($\beta$-ethoxy-ethylamino)-s-triazine, 2-chloro-4-methoxy-6-($\gamma$-methoxy-propylamino)-s-triazine, 2 - chloro - 4-methoxy-6-($\gamma$-isopropoxy-propylamino) - s-triazine, 2-chloro-4-allyloxy-6-($\gamma$-methoxy-propylamino)-s-triazine, 2-chloro-4-methoxy-6-(N-methyl-$\gamma$-methoxy-propylamino)-s-triazine, 2-chloro-4-allyloxy-6 - (N-ethyl-$\beta$-methoxy-ethylamino)-s-triazine, 2-chloro - 4 - methylmercapto - 6 - ($\gamma$-methoxy-propylamino)-s-triazine, 2 - chloro - 4-allylmercapto-6-($\beta$-methoxy-ethylamino)-s-triazine, 2-chloro-4-methylmercapto-6-(N-ethyl-$\beta$-methoxy-ethylamino)-s-triazine and 2-chloro-4-allylmercapto-6-(N-methyl-$\gamma$-methoxy-propylamino)-s-triazine.

These triazine compounds can be reacted, for example with methylamine, ethylamine, n-propylamine, isopropylamine, n-butylamine, isobutylamine, sec. butylamine, n-amylamine, isoamylamine, n-hexylamine, allylamine, methallylamine, dimethylamine, diethylamine, ethylisopropylamine, di-n-propylamine, di-n-butylamine, diallylamine or allyl-n-butylamine as amines of the general Formula VIII.

A second group of amines of this formula comprises, for example: $\beta$-methoxy-ethylamine, $\beta$-ethoxy-ethylamine, $\beta$-isopropoxy-ethylamine, $\beta$-n-butoxy-ethylamine, $\gamma$-methoxy-propylamine, $\gamma$-ethoxy-propylamine, $\gamma$-isopropoxy-propylamine, $\gamma$-ethoxy-butylamine, $\gamma$-n-butoxy-propylamine, $\gamma$-methoxy-butylamine, N-methyl-$\beta$-methoxy-ethylamine, N-ethyl-$\beta$-methoxy-ethylamine, N-methyl-$\gamma$-methoxy-propylamine and N-ethyl-$\gamma$-methoxy-propylamine.

Starting materials of the Formula IX are, for example: 2 - chloro - 4-methoxy-6-methylamino-s-triazine, 2-chloro-4-methoxy-6-ethylamino-s-triazine, 2-chloro-4-methoxy-6-isopropylamino-s-triazine, 2-chloro-4-methoxy-6-n-butylamino-s-triazine, 2-chloro-4-ethoxy-6-ethylamino-s-triazine, 2 - chloro-4-n-propoxy-6-ethylamino-s-triazine, 2-chloro-4 - n-butoxy-6-ethylamino-s-triazine, 2-chloro-4-methoxy-6-methallylamino-s-triazine, 2-chloro-4-isopropoxy-6 - allylamino - s-triazine, 2-chloro-4-allyloxy-6-ethylamino-s-triazine, 2-chloro-4-allyloxy, 6-methallylamino-s-triazine, 2-chloro-4-methoxy-6-diethylamino-s-triazine, 2-chloro-4-methoxy - 6-diallylamino-s-triazine, 2-chloro-4-allyloxy-6-diethylamino - s - triazine, 2-chloro-4-methylmercapto-6-ethylamino - s - triazine, 2-chloro-4-methylmercapto-6-isopropylamino - s-triazine, 2-chloro-4-methylmercapto-6-allylamino-s-triazine, 2-chloro-4-methylmercapto-6-diethylamino - s - triazine, 2-chloro-4-methylmercapto-6-diallylamino - s - triazine, 2-chloro-4-ethylmercapto-6-isopropylamino - s - triazine, 2-chloro-4-isopropylmercapto-6-ethylamino-s-triazine, 2-chloro-4-allylmercapto-6-methylamino-s-triazine, 2-chloro-4-allylmercapto-6-allylamino-s-triazine and 2-chloro-4-allylmercapto-6-diethylamino-s-triazine.

In addition, the compounds mentioned as representatives of Formula VII are also suitable as triazine derivatives of Formula IX.

Starting materials of the Formula XI are, on the one hand, substances which contain one single alkoxyalkylamino group and are identical with the end products of the Formula I. On the other hand, also compounds which each have an alkoxyalkyl group attached to each amino group can be used as starting materials of the Formula XI.

The compounds of the Formula XI can be reacted, for example, with the sodium compounds of methanol, ethanol, n-propanol, isopropanol, n-butanol, allyl alcohol, methylmercaptan, ethylmercaptan, isopropylmercaptan or allylmercaptan as examples of alcohols and mercaptans of the Formula XII.

2 - mercapto - 4 - ethylamino - 6 - ($\beta$ - methoxy - ethylamino) - s - triazine, 2 - mercapto - 4 - isopropylamino-6 - ($\beta$ - methoxy - ethylamino) - s - triazine, 2 - mercapto - 4 - allylamino - 6 - ($\beta$ - ethoxy - ethylamino) - s-triazine, 2 - mercapto - 4,6 - bis - (N - ethyl - $\beta$ - methoxy-ethylamino) - s - triazine, 2 - mercapto - 4,6 - bis - ($\gamma$ - methoxy - propylamino) - s - triazine, 2 - mercapto - 4-isopropylamino - 6 (γ - methoxy - propyl - amino) - s - triazine, 2 - mercapto - 4 - n - propylamino - 6 (γ - methoxy - propyl - amino) - s - triazine and 2 - mercapto-4,6 - bis - (γ - isopropoxy - propylamino) - s - triazine are suitable, for example as starting materials of the Formula XIII.

The alkali metal salts thereof can be reacted, for example, with methyl bromide, ethyl bromide, n-propyl bromide, allyl bromide, methallyl chloride, dimethyl sulfate, diethyl sulfate or with p-toluene sulfonic acid methyl ester as reactive esters of lower alkanols or alkenols.

The compounds of Formula VI are advantageously suitable as active ingredients for weed killers, both for the selective control of weeds among cultivated plants as well as for the total destruction and inhibition of undesired plant growth. By weeds are meant also undesired cultivated plants, for example, those from a previous crop. The compounds defined above also are suitable as active ingredients for the attainment of other inhibitory influences on plant growth, in particular defoliation, e.g. of cotton plants, desiccation, e.g. of potato plants, also for blossom thinning, prolongation of the harvesting period and storing properties.

More especially this aspect of the invention relates to new 2-methylthio-s-triazines which are useful as active ingredients in weed control agents in wheat and the like cereal cultures and are patricularly suited for combatting certain more recently spreading "mono"-weeds in such cultures. The invention further relates to the agents containing the aforesaid new triazines as the active ingredients as well as to a method of controlling weeds in wheat, rye, barley, millet, corn and the like cereal fields with the aid of these new triazines.

Whether a herbicide is useful in combatting weeds in cultivated fields depends upon a variety of factors.

Firstly, the herbicide must be free from phytotoxic effects on the cultivated plants in the field when applied in amounts which kill the majority of the weeds.

Secondly, the ratio between the toxicity limit above which substantial damage to the crop would occur, and the minimum amount at which sufficient herbicidal effect is achieved, must be a large one in order to provide a safety margin taking into account climatic factors (rain etc.) which may increase the active concentration of the herbicide in the soil in an unpredictable manner and also frequently occurring double spraying etc. at overlapping areas of treatment.

Thus, in the case of 2-chloro-4,6-bis-ethylamino-s-triazine, that ratio is relatively small as far as application in wheat, rye or barley fields is concerned, wherefore the use of simazine in such fields is dependent upon stable weather conditions.

Thirdly, and especially in the treatment of fields of the aforesaid cereals, it should be possible to apply larger concentrations of the herbicide in the pre-emergence period (late winter or early spring in the case of winter cereals, and early spring in the case of summer cereals), in order to build up a reserve of herbicide in the soil large enough to affect those weeds which are particularly tenacious and especially also those which have a late germination period (April to June in the northern hemisphere).

Among these tenacious weeds occurring in wheat and the like cereal crops there are two kinds especially distinguishable namely, broad-leaved weeds and grass-like weeds.

The intense use of 2,4-dichloro-phenoxyacetic acid-type hormone preparations has achieved successful suppression of the growth of broad-leaved weeds in wheat and the like fields.

This, however, increases the chances for the survival of the grass-type weeds. The latter type of weeds has been combatted in the past with such well-known triazine derivatives as 2-chloro-4,6-bis-ethylamino-s-triazine (simazine) and 2-chloro-4-ethylamino-6-isopropylamino-s-triazine (atrazine), but their use is limited by the fact that, while they are readily applicable in larger concentrations in corn fields, the toxicity limit of these herbicides in wheat, rye or barley fields is at about 300 to 600 grams (g.) per hectare (ha.), while their minimum amount for fully successful killing of the last-mentioned type of weeds is in the order of 350 to 400 g./ha., i.e. the above mentioned safety ratio is too narrow for assuring satisfactory heribicidal action and at the same time guaranteeing undamaged crops.

In fact, the last mentioned dosages are usually not sufficient to seriously affect weeds pertaining to such families as Geramineae, Compositae, Rubiaceae, Rosaceae, Ranunculaceae and Convolvulaceae.

Moreover, the past treatment of fields of wheat, rye, barley, oats, corn and the like cereals especially with hormonal agents has furthered the development of certain "mono"-weeds in these fields which are particularly pertinacious so that there is now an urgent need for new herbicides capable of killing these more recently spreading weeds, among which there are especially black grass (*Alopecurus myosuroides*), brome grass (*Bromus tectorum*), witch weed (*Striga asiatica*) and others.

As a fourth requirement of an ideal herbicide for use in wheat and the like cereal fields, there is the timely reduction of herbicidal activity in the soil after the harvesting of crop which had been protected by the herbicide, which reduction or termination of herbicidal activity is of special importance in case of crop rotation, where, for instance, a wheat crop is to be succeeded by a sugar crop, it being well known that sugar beet plants are particularly sensitive to herbicides.

It is therefore the main object of this invention to provide a herbicide which satisfies all the above-listed requirements, in that it has a wide tolerance span, that is (a) it can be applied in at least two or more times the amount required for a satisfactory killing of the weeds in wheat and the like cereal crops without showing any noteworthy damage to the crops; (b) it can be applied during the pre-emergence period in such amounts and has such residual effect that it will satisfactorily combat late-germinating weeds in the said type of crops; (c) it has a particularly low dosage limit for obtaining satisfactory kill of the above-mentioned more recently spreading mono-weeds; (d) its residual effect does not extend so far beyond the harvesting of the crop which is to be protected as to adversely affect a subsequent, more sensitive crop.

We have found that, surprisingly, this object is attained by using, as herbicide for the control of weeds in wheat and the like cereal fields, a 2-methylthio-s-triazine of the formula

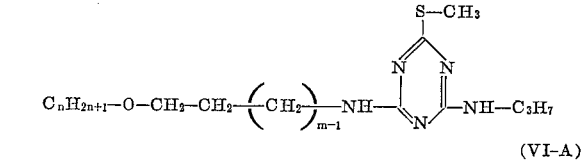

(VI-A)

wherein each of *m* and *n* is an integer ranging from 1 to 2; these compounds which fall under the general Formula VI, can be applied to wheat and the like cereal fields in amounts of up to 3 to 5 kilograms per hectare in pre-emergence as well as postemergence treatment without damaging the crop, and have a large tolerance span, since application of only about 400 grams per hectare of, for instance 2-methylthio-4-(γ-methoxy-propyl)-amino-6-isopropyl-amino-s-triazine practically eliminated black grass. Up to 3.3 kilograms of the last-mentioned compound and even 5 kilograms of 2-methylthio-4-(γ-methoxy-propyl)-amino-6-n-propylamino-s-triazine both falling under Formula VI–A, can be applied per hectare, for instance of a winter-wheat field, without damaging the crop. On the contrary an increase of the harvested amount of grain is usually obtained over that produced from untreated areas.

Moreover, the compounds of Formula VI–A, and in particular the two compounds mentioned above, possess all of the advantages which have been enumerated as desirable hereinbefore.

This is particularly unexpected, since structurally related s-triazines do not possess properties that would have led one to expect the above-described advantageous combination of properties from the compounds of Formula VI–A. Thus, about twice the amount of 2-methylthio-4,6-bis-(γ-methoxy-propyl-amino)-s-triazine is required when used alone in the control of weeds in wheat and the like fields to achieve a weed control effect similar to that of a given amount of 2-methylthio-4-(γ-methoxy-propyl-amino)-s-isopropyl-amino-s-triazine; yet, already 2-kilograms per hectare of the former compound inflict about 25% damage, while 3 kg./ha. therefore may kill half the stand of winter wheat.

On the other hand, 2-methylthio-4,6-bis-(isopropyl-amino)-s-triazine, which kills, for instance, black weed at about the same concentration as 2-methylthio-4-(γ-methoxy-propyl-amino)-6-isopropyl-amino-s-triazine, can be applied only in concentrations of 1 to 2 kg./ha. to winter wheat without damaging the stand of the crop. And 2-methoxy-4-(γ-methoxy-propyl-amino)-6-isopropyl-amino-s-triazine, which differs from the last mentioned compound according to the invention only by the presence of an oxygen in lieu of a sulfur atom, fails completely as a herbicide in wheat and the like cultures for it is more phytotoxic, for instance, to winter wheat itself than it is to the principal weeds growing in the fields of that cereal.

Of course, the compounds of Formula VI–A are also suitable both for the selective killing of weeds among the cultivated plants in particular peanuts and cotton, and for the killing of weeds on uncultivated ground such as that of industrial plants, or railway lines or paths.

The weed killers (i.e. the active ingredient) according to this second aspect of the invention can be employed in conjunction with an agricultural adjuvant in the form of solutions, emulsions, suspensions, pastes, dusts or granules. All forms of application, however, must ensure that the active ingredient is contained in a finely distributable form. In particular, when used for the total destruction of plant growth, early desiccation as well as defoliation, the action can be increased by the use of carriers having a phytotoxic action such as, e.g. high boiling mineral oil fractions; on the other hand, the selectivity of the inhibitory action, e.g. in selective weed killing, is generally better attained by using carriers which are inert to plants.

In particular higher boiling organic liquids such as mineral oil fractions, coal tar oils as well as also vegetable and animal oils are used for the production of solutions. In order to more easily dissolve the active ingredients in these liquids, possibly slight amounts of organic liquids having better dissolving powers and generally a lower boiling point can be added, i.e. solvents such as alcohols, e.g. ethanol or isopropanol, ketones, e.g. acetone butanone or cyclohexanone diacetone alcohol, cyclic hydrocarbons e.g. benzene, toluene or xylene, chlorinated hydrocarbons e.g. tetrachlorethane or ethylene chloride or mixtures of such substances.

The aqueous forms of application are chiefly emulsions and dispersions. Compounds of Formula VI are homogenised in water either as such or in one of the solvents named above, with the aid of surface active emulsifying or dispersing agents. Cation active emulsifying agents are, e.g. quaternary ammonium compounds and alkyl polyoxyethylene amines such as Katapol PN–430 of Antara Chemicals. Anion active emulsifying and dispersing agents comprise soaps, soft soaps, salts of alkylaryl sulphonates such as Nekal BX–78 of Antara Chemicals, Ninate 402 of Nino Laboratories Inc., Sellogen HR of Jacques Wolf & Co., Tinovetin B of J. R. Geigy A. G., salts of fatty alcohol sulfonates such as Duponol L 144–WDG of E. I. du Pont de Nemours & Co., salts of sulphonates of vegetable or animal oils, and complex sulphonates such as Emcol H–A, H–B and H–C of Emulsol Chemical Corp. Nonionic emulsifying agents are, e.g. polyethylene glycol ethers of alkylphenols and other polyethers such as Triton X–100 of Rohm & Haas Co., Agrimul 70A and 70B of Nopco Chemicals Co., polyethylene glycol esters of fatty acids such as Nonisol 100 and Nonisol 200 of Geigy Chemical Corp. and Emulsan O and Emulsan K of Reilly-Whiteman-Walton Co., polyoxyethylene sorbitan esters of fatty acids used together with corresponding sorbitan esters such as Tween 60 together with Span 60 of Atlas Powder Co. Anionic agents are used in many cases advantageously in combination with nonionic agents or use is made of commercial blends of anionic and nonionic agents such as Toximul 500 of Ninol Laboratories, Agrimul GA of Nopco Chemical Co., Emcol H 400, H 500, H 600, H 700 or H 800 of Emulsol Chemical Corp., HS–31 emulsifier of Thompson Chemicals Corp. or T–H emulsifiers of Thompson-Hayward Chemical Co. Liquid or pasty concentrates suitable for dilution with water comprise a herbicidal substance according to the invention, an emulsifying or dispersing agent, and if desired, a solvent as mentioned above.

Dusts and sprinkling agents can be produced by mixing or milling the active ingredient with a solid carrier. Such carriers are: talcum, diatomaceous earth, kaolin, bentonite, calcium carbonate, tricalcium phosphate, sand, or also sawdust, ground cork, and other materials of vegetable origin. On the other hand, the carriers can also be impregnated with solutions of the active ingredients in a volatile solvent and evaporating the latter. By the addition of surface active agents, e.g. the emulsifying agents mentioned above, and protective colloids, e.g. sulphite waste liquor, pulverulent preparations and pastes can be made suspendable in water and used as sprays.

The various forms for application can be more closely adapted to the intended use in the usual way by the addition of substances which improve or decrease the distribution and penetration into the ground depending on the depth of roots of the weeds to be destroyed. The biological effect can be widened by the addition of substances having bactericidal or fungicidal properties, for example, for the attainment of a general earth sterilisation or, in selective weed killing, for the protection of cultivated plants from other injurious organisms. Substances which also influence plant growth, such as, e.g. 3-amino-1,2,4-triazole to accelerate the onset of action, or, e.g. salts of α,α-dichloro-propionic acid to widen the range of herbicidal action, may possibly be desirable. A combination with fertilisers may be labour saving and can favour the action of the herbicide.

The amounts of Formula VI compounds necessary per acre vary in selective weed killing dependent on the sensitivity of the weeds, the resistance of the cultivated plants, the time of application, climatic conditions and the condition of the ground, between about 0.25 to 10 lbs. per acre (2.5–100 g. per 100 sq. meters), whilst for the complete elimination of plant growth generally about 5–20 lbs. per acre (50–200 g. per 100 sq. meters) should be used. In certain cases, however, the above amounts can also be exceeded.

The amounts of Formula VI–A compounds necessary per hectare vary in selective weed killing dependent on the sensitivity of the weeds, the resistance of the cultivated plants, the time of application, climatic conditions and the condition of the ground; between about 0.2 to 2 kilograms per hectare should be used. As has been explained above, the above amounts can also be exceeded and up to 3 to 5 kilograms can be applied in cereal fields, especially in pre-emergence application. Depending on the season of the year, the climatic conditions of the region, and the type of soil, the maximum applicable amount of the herbicides according to the invention varies, but does not exceed, in practical cases, 8 kg./ha.

The following examples further illustrate the production of the active triazines according to this second aspect of the invention as well as their application. Parts are always given as parts by weight and the temperatures are in degrees centigrade.

Example 10

4.6 parts of sodium are dissolved in 400 parts of anhydrous methanol, 57.9 parts of 2-chloro-4,6-bis-(γ-methoxy-propylamino)-s-triazine are then added and the whole is refluxed for 48 hours. Precipitated sodium chloride is then filtered off in the heat, and the excess methanol is then evaporated off. The remaining crude 2-methoxy-4,6 - bis-(γ-methoxy - propylamino)-s-triazine is recrystallised from cyclohexane and then melts at 57–59°.

Example 11

2.35 parts of metallic sodium are dissolved in 200 parts of anhydrous methanol and then 26 parts of 2-chloro-4-isopropylamino-6-(γ-methoxy-propylamino)-s-triazine are added. The reaction solution is then refluxed for 2 hours, precipitated sodium chloride is filtered off, the excess methanol is distilled off and the residue is recrystallised from isopropyl ether. The analytically pure 2-methoxy-4-isopropylamino-6-(γ-methoxy - propylamino)-s-triazine melts at 82–83°.

Instead of the metallic sodium, also 4.1 parts of pulverised sodium hydroxide can be used.

Example 12

17.8 parts of γ-methoxy-propylamine are added to 18 parts of 2-chloro-4-methoxy-6-isopropylamino-s-triazine in 200 parts of anhydrous benzene. The reaction mixture is boiled under reflux until all the chlorine is in the form of the hydrochloride of the excess amine. After cooling, the reaction mixture is washed with water to remove the γ-methoxy-propylamine hydrochloride. The substance described in Example 11 is obtained from the benzene solution by evaporating and crystallising the residue.

Half the amount used of γ-methoxy-propylamine can be replaced by 4.0 parts of sodium hydroxide but in this case the reaction should be performed in water or, better, in aqueous acetone.

The following compounds, for example, can be produced in the manner described in Examples 10, 11 or 12.

2-methoxy-4-ethylamino-6-(β - methoxy - ethylamino)-s-triazine, M.P. 80–81°,
2-methoxy-4-isopropylamino-6-(β - methoxy-ethylamino)-s-triazine, M.P. 57–59.5°,
2-methoxy-4-ethylamino-6-(β-ethoxy-ethylamino)-s-triazine, B.P.$_{0.008}$ 155–157°,
2-methoxy-4-isopropylamino-6-(β-ethoxy-ethylamino)-s-triazine, B.P.$_{0.0005}$ 145–146°,
2-methoxy-4-ethylamino-6-(γ-methoxy-propylamino)-s-triazine, M.P. 81–83.5°,
2-methoxy-4-n-butylamino-6-(γ-methoxy-propylamino)-s-triazine,
2-methoxy-4-methylamino-6-(β-methoxy-ethylamino)-s-triazine,
2-methoxy-4-ethylamino-6-(γ-isopropoxy-propylamino)-s-triazine,
2-methoxy-4-isopropylamino-6-(γ-isopropoxy-propylamino)-s-triazine,
2-methoxy-4-n-butylamino-6-(β-ethoxy-ethylamino)-s-triazine,
2-methoxy-4-methylamino-6-(β-isopropoxy-ethylamino)-s-triazine,
2-ethoxy-4-ethylamino-6-(β-methoxy-ethylamino)-s-triazine,
2-ethoxy-4-isopropylamino-6-(β-methoxy-ethylamino)-s-triazine,
2-ethoxy-4-ethylamino-6-(β-ethoxy-ethylamino)-s-triazine,
2-ethoxy-4-isopropylamino-6-(β-ethoxy-ethylamino)-s-triazine,
2-ethoxy-4-isopropylamino-6-(γ-methoxy-propylamino)-s-triazine,
2-n-propoxy-4-ethylamino-6-(β-methoxy-ethylamino)-s-triazine,
2-n-butoxy-4-ethylamino-6-(γ-methoxy-propylamino)-s-triazine,
2-methoxy-4-allylamino-6-(γ-methoxy-propylamino)-s-triazine,
2-methoxy-4-methallylamino-6-(β-ethoxy-ethylamino)-s-triazine,
2-methoxy-4-diethylamino-6-(β-methoxy-allylamino)-s-triazine,
2-methoxy-4-diallylamino-6-(γ-isopropoxy-propylamino)-s-triazine,
2-methoxy-4-diethylamino-6-(γ-n-butoxy-propylamino)-s-triazine,
2-ethoxy-4-dimethylamino-6-(γ-isopropoxy-propylamino)-s-triazine,
2-isopropoxy-4-diethylamino-6-(β-methoxy-ethylamino)-s-triazine,
2-methoxy-4-(N-butyl-allylamino)-6-(β-ethoxy-ethylamino)-s-triazine,
2-methoxy-4-diallylamino-6-(γ-methoxy-propylamino)-s-triazine,
2-mehoxy-4,6-bis-(β-methoxy-ethylamino)-s-triazine, B.P.$_{0.002}$ 169°,
2-methoxy-4,6-bis-(β-ethoxy-ethylamino)-s-triazine, M.P. 49–50.5°,
2-methoxy-4,6-bis-(γ-isopropoxy-propylamino)-s-triazine,
2-ethoxy-4,6-bis-(β-methoxy-ethylamino)-s-triazine,
2-ethoxy-4,6-bis-(β-ethoxy-ethylamino)-s-triazine,
2-ethoxy-4,6-bis-(γ-methoxy-propylamino)-s-triazine,
2-methoxy-4-ethylamino-6-(N-ethyl-β-methoxy-ethylamino)-s-triazine,
2-methoxy-4-isopropylamino-6-(N-methyl-γ-methoxy-propylamino)-s-triazine,
2-ethoxy-4-allylamino-6-(N-ethyl-γ-isopropoxy-propylamino)-s-triazine,
2-methoxy-4-diethylamino-6-(N-ethyl-γ-methoxy-propylamino)-s-triazine,
2-methoxy-4,6-bis-(N-ethyl-γ-methoxy-propylamino)-s-triazine,
2-ethoxy-4,6-bis-(N-methyl-β-methoxy-ethylamino)-s-triazine,
2-allyloxy-4-ethylamino-6-(γ-methoxy-propylamino)-s-triazine,
2-allyloxy-4-methallylamino-6-(β-methoxy-ethylamino)-s-triazine,
2-methallyloxy-4-diallylamino-6-(γ-isopropoxy-propylamino)-s-triazine,
2-allyloxy-4,6-bis-(γ-methoxy-propylamino)-s-triazine,
2-methylmercapto-4-ethylamino-6-(β-methoxy-ethylamino)-s-triazine,
2-methylmercapto-4-ethylamino-6-(γ-methoxy-propylamino)-s-triazine,
2-isopropylmercapto-4-methylamino-6-(γ-isopropoxy-propylamino)-s-triazine,
2-methylmercapto-4-diethylamino-6-(β-methoxy-ethylamino)-s-triazine,
2-ethylmercapto-4,6-bis-(γ-methoxy-propylamino)-s-triazine,
2-methylallylmercapto-4-ethylamino-6-(β-ethoxy-ethylamino)-s-triazine,
2-allylmercapto-4-diethylamino-6-(β-methoxy-ethylamino)-s-triazine,
2-methallylmercapto-4-diallylamino-6-(γ-methoxy-propylamino)-s-triazine,
2-allylmercapto-4,6-bis-(γ-isopropoxy-propylamino)-s-triazine.

Example 12A

In accordance with the method described by Klason in Journal für praktische Chemie, (2), 33, page 296 (1886), 26 parts of 2-chloro-4-isopropyl-amino-6-(γ-methoxy-propylamino)-s-triazine are admixed with 100 parts of concentrated aqueous potassium hydrosulfide solution and stirred until a practically clear solution is obtained. The mixture is then neutralized with acetic acid whereby precipitation of the resulting 2-mercapto-4-isopropylamino-6-(γ-methoxy-propylamino) - s - triazine occurs. The crystalline product is separated by filtration and washed with cold water. This product can then be directly converted to the corresponding 2-methylthio derivative as described in the following example.

In an analogous manner the other 2-chloro-s-triazines and 2-bromo-s-triazines obtained as described in Example 1 are converted to the corresponding 2-mercapto-s-triazines, namely:

2-mercapto-4-isopropylamino-6-(β-methoxy-ethyl-amino)-s-triazine,
2-mercapto-4-isopropylamino-6-(β-ethoxy-ethyl-amino)-s-triazine,
2-mercapto-4-isopropylamino-6-(β-methoxy-ethyl-amino)-s-triazine,
2-mercapto-4-isopropylamino-6-(γ-methoxy-propyl-amino)-s-triazine,
2-mercapto-4-n-propylamino-6-(γ-methoxy-propyl-amino)-s-triazine.

*Example 13*

2.3 parts of sodium are dissolved in 200 parts of anhydrous methanol and then 25.7 parts of 2-mercapto-4-isopropylamino-6-(γ-methoxy-propylamino)-s-triazine are added. 20 parts of methyl iodide are then added dropwise and the reaction mixture is stirred at 40–50° until it has a neutral reaction. The solvent is then distilled off, the residue is taken up in benzene, the solution is washed with 2 N-caustic soda lye and with water, the benzene is eliminated and the 2-methylmercapto-4-isopropylamino-6-(γ-methoxy-propylamino) - s - triazine is recrystallised from petroleum ether. M.P. 68–70°.

In an analogous manner, the other 2-mercapto-s-triazines described in Example 12A are converted to the corresponding 2-methylthio-s-triazines, namely:

2-methylthio-4-isopropylamino-6-(β-methoxy-ethyl-amino)-s-triazine and
2-methylthio-4-n-propylamino-6-(β-ethoxy-ethyl-amino)-s-triazine.

*Example 14*

10 parts of 2-methoxy-4,6-bis-(γ-methoxy-propylamino)-s-triazine and 90 parts of talcum are ground in a ball mill. The mixture obtained serves as a dust.

Repeating the above, but employing 2-methoxy-4-isopropylamino-6-(γ-methoxy-propylamino)-s-triazine as the active ingredient, a suitable dust is obtained.

The ball mill in the above can be substituted with a pin beater mill or another suitable mill.

*Example 15*

20 parts of active ingredient, 2-methoxy-4-ethylamino-6-(γ-methoxy-propylamino)-s-triazine are dissolved in a mixture of 48 parts of diacetone alcohol, 16 parts of xylene and 16 parts of an anhydrous polyethylene glycol ester of higher fatty acids. This concentrate can be diluted with water to form emulsions of any concentration desired.

*Example 16*

50–80 parts of 2-methoxy-4-isopropylamino-6-(γ-methoxy-propylamino)-s-triazine are mixed with 2–5 parts of a wetting agent i.e. a sulphuric acid ester of an alkyl polyethylene glycol ether, 1–5 parts of a protective colloid i.e. sulphite waste liquor and 14–44 parts of an inert solid carrier i.e. bentonite and the mixture is then finely milled in a suitable mill. The wettable powder obtained can be stirred up with water and produces very stable suspensions.

Stable suspensions are also had when in place of the bentonite employed above, kaolin, chalk or kieselguhr is utilized.

*Example 17*

10 parts of 2-methoxy-4-isopropylamino-6-(γ-methoxy-propylamino)-s-triazine are dissolved in 60–80 parts of a high boiling organic liquid i.e. diesel oil (coal tar or spindle oil can also be used) to which 30–10 parts of xylene have been added. It can be used as a spray.

A similar spray can be had if 2-methoxy-4-ethylamino-6-(β-ethoxy-ethylamino)-s-triazine is employed in place of 2-methoxy - 4 - isopropylamino-6-(γ-methoxy-propylamino)-s-triazine.

*Example 18*

5–10 parts of active ingredient, 2-methoxy-4-ethyl-amino-6-(γ-methoxy-propylamino)-s-triazine are mixed and milled with 95–90 parts of calcium carbonate (=ground limestone). The product can be used as a sprinkling agent.

A suitable sprinkling agent can be had if 2-methoxy-4,6-bis(γ-methoxy-proplyamino)-s-triazine is employed in place of 2-methoxy-4-ethyl-amino-6-(γ-methoxy-propylamino)-s-triazine.

*Example 19*

95 parts of a granula carrier, i.e. sand, are moistened with 1–5 parts of water (isopropanol or polyethylene glycol could also be used) and then 5 parts of active ingredient 2-methoxy-4-ethyl-amino-6-(γ-methoxy-propylamino)-s-triazine are mixed in.

A greater amount, e.g. 100–900 parts of a possibly water soluble fertiliser such as e.g. ammonium sulfate or urea can be mixed with the above mixture or with one containing more active ingredient, e.g. 10 parts of active ingredient and 90 parts of calcium carbonate. The granulates obtained can be sprinkled.

*Example 20*

50 parts of 2-methoxy-4-isopropylamino-6-(γ-methoxy-propylamino)-s-triazine are added to 45 parts of xylene and the whole is combined with 5 parts of Toximul 500. A concentrate for the preparation of emulsions which in water can be emulsified in any ratio desired, is obtained.

If 2 - methoxy-4,6-bis-(β-ethoxy-ethylamino)-s-triazine is employed in place of 2-methoxy-4-isopropylamino-6-(γ-methoxy-propylamino)-s-triazine an applicable concentrate is obtained.

*Example 21*

Between May 19 and 22, 1959, various types of cultivated plants were sown or planted in slightly marly sandy soil containing little organic matter (not fertiliser). On June 24, they were treated by portable spray with 0.2 litre per sq. m. of suspensions of the active susbtances to be tested. Each plot of cultivated plants, 7.5 sq. m., was treated with one concentration of active substance so that each concentration could be tested. The concentrations used were 0.05%, 0.125%, 0.25% and 0.5% corresponding respectively to 0.1 g., 0.25 g., 0.5 g. and 1 g. per sq. m. (about 0.9, 2.2, 4.5 and 9 lbs. per acre).

On evaluating the results on July 21, 95% of the annual weeds had been killed on the plots treated with the lowest concentration of 2-methoxy-4,6-bis-(γ-methoxy-propylamino)-s-triazine (emulsion prepared from 50% emulsifiable solution) whilst no damage was done to the following cultivated plants: tomatoes (80 cm.), savoy cabbage (*Brassica oleracea* var. *sabauda* L) (40 cm.), kohlrabi (*Brassica oleracea* var. *gongylodes*) (40 cm.), gladioli (shoots), corn (shoots), flax (20 cm.), beans (*Phaseolus vulgaris*) (20 cm.). The height of the plants is given in brackets. The first three types were planted, the others were either sown or set. Gladioli, flax and beans were also not damaged by the second lowest concentration with which 99% of annual weeds were destroyed.

During the test period, 55.3 mm. of rain were recorded, mostly towards the end of the time. The plots were sprayed when no rain fell.

A third aspect of the invention relates to herbicidal compositions containing new triazine derivatives of the formula

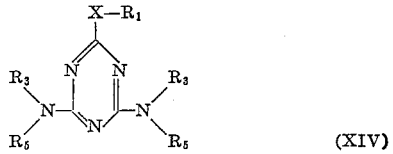

wherein $R_1$ represents a lower alkoxyalkyl, lower alkylmercaptoalkyl or lower alkoxyalkoxyalkyl radical, $R_3$ represents, independently in each occurrence, a lower alkyl, lower alkenyl or lower alkoxyalkyl radical, $R_5$ represents, independently in each occurrence, hydrogen, a lower alkyl or lower alkenyl radical, and X represents sulphur, and methods of employing same.

The β-lower alkoxy-ethyl and γ-lower alkoxy-propyl radicals are the preferred embodiments of lower alkoxyalkyl radicals.

The new triazines of Formula XIV have excellent herbicidal properties and are suitable both for the selective killing of weeds among cultivated plants and for the killing of weeds on uncultivated ground such as that of industrial plants, railway or tram lines or paths.

To produce the new compounds of Formula XIV, triazine derivatives of the formula

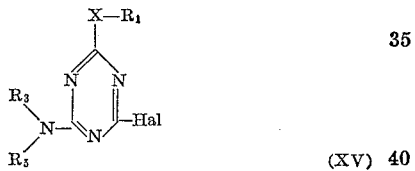

are reacted with one mol of an amine of the formula

in the presence of an acid binding agent.

In the above formulae, $R_1$, $R_3$, $R_5$ and X have the meanings given in Formula XIV. Hal represents chlorine or bromine. For economic reasons, in the starting materials of Formula XV, Hal is advantageously chlorine.

Most simply, an excess of the amine to be reacted is used as acid binding agent. In reactions with triazine derivatives of the Formula XV, the excess can be up to one mol and even more if desired. Also, for example, alkali hydroxides or alkali carbonates can be used as acid binding agents.

Compounds of the Formula XIV as also obtained by reacting a triazine derivative of the formula

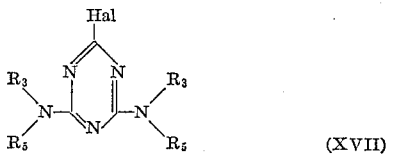

with an alkali metal compound of a mercaptan of the formula

In the above formulae, Hal, $R_1$, $R_3$ and $R_5$ have the meanings given in Formula XIV.

The reactions can be performed, for example in an excess of the mercaptan to be reacted at a raised temperature, for example at the boiling temperature of such mercaptan. Also, however, alkali mercaptides of the Formula XVIII can be reacted in suitable inert organic solvents such as, e.g. hydrocarbons of the benzene series, with the triazine compounds of the Formula XVII.

Finally, compounds of the Formula XIV can also be produced by reacting alkali metal salts of triazine derivatives of the formula

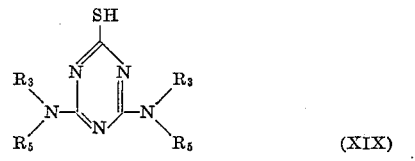

with reactive esters of low molecular alkoxyalkanols or alkylmercapto-alkanols. In the above formula $R_3$ and $R_5$ have the meanings given in Formula XIV.

Suitable starting materials of the Formula XV are, for example:

2-chloro-4-(β-methoxy-ethylmercapto)-6-methylamino-s-triazine,
2-chloro-4-(β-methoxy-ethylmercapto)-6-ethylamino-s-triazine,
2-chloro-4-(β-methoxy-ethylmercapto)-6-isopropylamino-s-triazine,
2-chloro-4-(β-ethoxy-ethylmercapto)-6-ethylamino-s-triazine,
2-chloro-4-(β-ethoxy-ethylmercapto)-6-n-butylamino-s-triazine,
2-chloro-4-(β-methoxy-ethylmercapto)-6-allylamino-s-triazine,
2-chloro-4-(β-methoxy-ethylmercapto)-6-diethylamino-s-triazine,
2-chloro-4-(β-methoxy-ethylmercapto)-6-diallylamino-s-triazine,
2-chloro-4-(β-methoxy-ethylmercapto)-6-(γ-methoxypropylamino)-s-triazine,
2-chloro-4-(β-ethoxy-ethylmercapto)-6-(β-methoxy-ethylamino)-s-triazine,
2-chloro-4-(β-methylmercapto-ethylmercapto)-6-isopropylamino-s-triazine,
2-chloro-4-(β-ethylmercapto-ethylmercapto)-6-ethylamino-s-triazine and
2-chloro-4-(β-ethylmercapto-ethylmercapto)-6-ethylamino-s-triazine.

These triazine compounds can be reacted, for example, with methylamine, ethylamine, n-propylamine, isopropylamine, n-butylamine, isobutylamine, sec. butylamine, n-amylamine, isoamylamine, n-hexylamine, allylamine, methallylamine, dimethylamine, diethylamine, ethylisopropylamine, di-n-propylamine, di-n-butylamine, diallylamine or allkyl-n-butylamine as amines of the Formula XVI. A second group of amines of this formula comprises, for example: β-methoxy-ethylamine, β-ethoxy-ethylamine, β-isoproxyl-ethylamine, β-n-butoxy-ethylamine, γ-methoxy-propylamine, γ-ethoxy-propylamine, γ-isopropoxy-propylamine, γ-ethoxy-butylamine, γ-n-butoxy-propylamine, γ-methoxy-butylamine, N-methyl-β-methoxyethylamine, N-ethyl-β-methoxy-ethylamine, N-methyl-γ-methoxy-propylamine and N-ethyl-γ-methoxy-propylamine.

Starting materials of the Formula XVII are, for example:

2-chloro-4,6-bis-ethylamino-s-triazine,
2-bromo-4,6-bis-ethylamino-s-triazine,
2-chloro-4-methylamino-6-isopropylamino-s-triazine,
2-chloro-4-ethylamino-6-isopropylamino-s-triazine,
2-bromo-4-ethylamino-6-isopropylamino-s-triazine,
2-chloro-4,6-bis-isopropylamino-s-triazine,
2-chloro-4-isopropylamino-6-diethylamino-s-triazine.

Further compounds of Formula XVII are those containing one alkoxyalkylamino group which are identical with end products of Formula I. A third group of starting materials of Formula XVII are those containing two alkoxyalkylamino groups such as 2-chloro-4,6-bis-(β-methoxy-ethylamino)-s-triazine,
2-chloro-4,6-bis-(γ-methoxy-propylamino-)-s-triazine,
2-chloro-4,6-bis-(γ-isopropoxy)-propylamino)-s-triazine,
2-bromo-4,6-bis-(γ-methoxy-propylamino)-s-triazine,
2-chloro-4,6-bis(N-ethyl-β-methoxy-ethylamino)-s-triazine,
2-chloro-4,6-bis-(N-methyl-γ-methoxy-propylamino-s-triazine and
2-cholor-4-(N-ethyl-β-methoxy-ethylamino)-6-(γ-methoxy-propylamino)-s-triazine.

2-mercapto-4,6-bis-ethylamino-s-triazine,
2-mercapto-4,6-bis-isopropylamino-s-triazine,
2-mercapto-4-methylamino-6-isopropylamino-s-triazine and
2-mercapto-4-ethylamino-6-isopropylamino-s-triazine as well as
2 - mercapto-4-ethylamino-6-(β-methyloxy-ethylamino)-s-triazine,
2-mercapto-4-isopropylamino-6-(β-methoxy-ethylamino)-s-triazine,
2-mercapto-4-allylamino-6-(β-ethoxy-ethylamino)-s-triazine,
2-mercapto-4,6-bis-(N-ethyl-β-methoxy-ethylamino)-s-triazine,
2-mercapto-4,6-bis-(γ-methoxy-propylamino)-s-triazine and
2-mercapto-4,6-bis-(γ-isopropoxy-propylamino)-s-triazine are suitable, of example as starting materials of the Formula XIX.

The alkali metal salts thereof can be reacted, for example, with chlormethyl methyl ether, methoxyethyl chloride, ethoxyethyl chloride, isopropoxyethyl chloride, n-butoxyethyl chloride, methylchloromethyl sulphide, ethylchloromethyl sulphide, isopropylchloromethyl sulphide, B-methylmercapto-ethyl chloride and β-ethylmercapto-ethyl chloride.

The compounds of the Formula XIV defined above are excellently suitable as active ingredients for weed killers, both for the selective control of weeds among cultivated plants as well as for the total destruction and inhibition of undesired plant growth. By weeds are meant also undesired cultivated plants, for example, those from a previous crop. Compounds of Formula XIV also are suitable as active ingredients for the attainment of other inhibitory influences on plant growth, in particular defoliation, e.g. of cotton plants desiccation e.g. of potato plants, also for blossom thinning, prolongation of the harvesting period and storing propensities.

The weed killers according to this third aspect of the invention can be used with an agricultural adjuvant in the form of solutions, emulsions, suspensions, pastes, dusts or granules. All forms of application, however, must ensure that the active ingredient is contained in a finely distributable form. In particular, when used for the total destruction of plant growth, early desiccation as well as defoliation, the action can be increased by the use of carriers having a phytotoxic action such as, e.g. high boiling mineral oil fractions; on the other hand, the selectivity of the inhibitory action, e.g. in selective weed killing, is generally better attained by using carriers which are inert to plants.

In particular higher boiling organic liquids such as mineral oil fractions, coal tar oils as well as also vegetable and animal oils are used for the production of solutions. In order to more easily dissolve the active ingredients of Formula XIV in these liquids, if desired, slight amounts of organic liquids having better dissolving powers and generally a lower boiling point can be added i.e. solvents such as alcohols, e.g. ethanol or isopropanol, ketones, e.g. acetone, butanone or cyclohexanone, diacetone alcohol, cyclic hydrocarbons, e.g. benzene, toluene or xylene, chlorinated hydrocarbons, e.g. tetrachlorethane or ethylene chloride or mixtures of such substances.

The aqueous forms of application are chiefly emulsions and dispersions. Compounds of Formula XIV are homogenised in water either as such or in one of the solvents named above, with the aid of surface active, emulsifying or dispersing agents. Cation active emulsifying agents are, e.g. quaternary ammonium compounds and alkyl polyoxyethylene amines such as Katapol PN-430 of Antara Chemicals. Anion active emulsifying and dispersing agents comprise soaps, soft soaps, salts of alkylaryl sulphonates such as Nekal BX-78 of Antara Chemicals, Ninate 402 of Ninol Laboratories Inc., Sellogen HR of Jacques Wolf & Co., Tinovetin B of J. R. Geigy A.G., salts of fatty alcohol sulfonates such as Duponol L 144-WDG of E. I. du Pont de Nemours & Co., salts of sulphonates of vegetable or animal oils, and complex sulphonates such as Emcol H–A, H–B and H–C of Emulsol Chemical Corp. Nonionic emulsifying agents are, e.g. polyethylene glycol ethers of alkylphenols and other polyethers such as Triton X–100 of Rohm & Haas Co., Agrimul 70A and 70B of Nopco Chemicals Co., polyethylene glycol esters of fatty acids such as Nonisol 100 and Nonisol 200 of Geigy Chemical Corp. and Emulsan O and Emulsan K of Reilly-Whiteman-Walton Co., polyoxyethylene sorbitan esters of fatty acids used together with corresponding sorbitan esters such as Tween 60 together with Span 60 of Atlas Powder Co. Anionic agents are used in many cases advantageously in combination with nonionic agents or use is made of commercial blends of anionic and nonionic agents such as Toximul 500 of Ninol Laboratories, Agrimul GA of Nopco Chemical Co., Emcol H 400, H 500, H 600, H 700 or H 800 of Emulsol Chemical Corp., HS–31 emulsifier of Thompson Chemicals Corp. or T–H emulsifiers of Thompson-Hayward Chemical Co. Liquid or pasty concentrates suitable for dilution with water comprise a herbicidal substance according to the invention, an emulsifying or dispersing agent and, if desired, a solvent as mentioned above.

Dusts and sprinkling agents can be produced by mixing or milling the active ingredient with a solid carrier. Such carriers are: talcum, diatomaceous earth, kaolin, bentonite, calcium carbonate, tricalcium phosphate, sand, or also sawdust, ground cork, and other materials of vegetable origin. On the other hand, the carriers can also be impregnated with solutions of the active ingredients in a volatile solvent and evaporating the latter. By the addition of surface active agents, e.g. the emulsifying agents mentioned above, and protective colloids, e.g. sulphite waste liquor, pulverulent preparations and pastes can be made suspendable in water and used as sprays.

The various forms for application can be more closely adapted to the intended use in the usual way by the addition of substances which improve or decrease the distribution and penetration into the ground depending on the depth of roots of the weeds to be destroyed. The biological effect can be widened by the addition of substances having bactericidal or fungicidal properties, for example, for the attainment of a general earth sterilisation, or, in selective weed killing, for the protection of cultivated plants from other injurious organisms. Substances which also influence plant growth, such as, e.g. 3-amino-1,2,4-triazole to accelerate the onset of action, or, e.g. salts of α,α-dichloropropionic acid to widen the range of herbicidal action, may possibly be desirable. A combination with fertilisers may be labour saving and can favour the action of the herbicide.

The amounts of Formula XIV compounds necessary per acre vary in selective weed killing dependent on the sensitivity of the weeds, the resistance of the cultivated plants, the time of application, climatic conditions and the condition of the ground, between about 0.25 and 10 lbs. per acre (2.5–100 g. per 100 sq. metres), whilst for the complete elimination of plant growth generally about 5–20 lbs. per acre (50–200 g. per 100 sq. metres) should be used. In certain cases, however, the above amounts can also be exceeded.

The following examples further illustrate the production of the active ingredients according to this third aspect of the invention, as well as application of these active ingredients. Parts are always given as parts by weight and the temperatures are in degrees centigrade.

*Example 21A*

4.6 parts of sodium are dissolved in 150 parts of β-ethoxy-ethylmercaptan; 40.3 parts of 2-chloro-4,6-bis-ethylamino-s-triazine are added to the solution and the whole is refluxed for 30 hours. Precipitated sodium chloride is then removed from the almost neutral reaction mixture by filtering while hot. On cooling, 2-(β-ethoxy-ethylmercapto) - 4,6 - bis - ethylamino - s - triazine crystallises from the filtrate.

Also 8 parts of finely pulverised sodium hydroxide can be used instead of the metallic sodium as well as β-methoxyethylmercaptan in place of β-ethoxyethylmercaptan.

Likewise, on using the corresponding mercaptan,
2-(β-ethylmercapto-ethylmercapto)-4,6-bis-ethylamino-s-triazine,
2-(β-n-propoxy-ethylmercapto)-4,6-bis-ethylamino-s-triazine,
2-(β-n-butoxy-ethylmercapto)-4,6-bis-ethylamino-s-triazine,
2-(β-n-hexyloxy-ethylmercapto)-4,6-bis-ethylamino-s-triazine,
2-(methoxyethoxyethylmercapto)-4,6-bis-ethylamino-s-triazine,
2-(ethoxyethoxyethylmercapto)-4,6-bis-ethylamino-s-triazine,
2-(γ-ethoxy-propylmercapto)-4,6-bis-ethylamino-s-triazine,
2-(γ-ethoxy-butylmercapto)-4,6-bisethylamino-s-triazine,
2-(ε-ethoxy-amylmercapto)-4,6-bis-ethylamino-s-triazine,
2-(β-methylmercapto-ethylmercapto)-4,6-bis-ethylamino-s-triazine,
2-(β-ethylmercapto-ethylmercapto)-4,6-bis-ethylamino-s-triazine,
2-(n-propoxy-ethoxyethylmercapto)-4,6-bis-ethylamino-s-triazine and
2-(n-butoxy-ethoxyethylmercapto)-4,6-bis-ethylamino-s-triazine
are obtained.

On the other hand, by analogous reaction of β-methoxy-ethyl mercaptan with corresponding 2-chloro-4,6-diamino-s-triazines,
2-(β-methoxy-ethylmercapto)-4-ethylamino-6-isopropylamino-s-triazine,
2-(β-methoxy-ethylmercapto)-4-diethylamino-6-isopropylamino-s-triazine and
2-(β-methoxy-ethylmercapto)-4,6-bis-isopropylamino-s-triazine
are obtained by analogous reaction of β-ethoxyethyl-mercaptan with corresponding 2-chloro-4,6-diamino-s-triazines,
2-(β-ethoxy-ethylmercapto)-4,6-bis-isopropylamino-s-triazine,
2-(β-ethoxy-ethylmercapto)-methylamino-6-isopropylamino-s-triazine,
2-(β-ethoxy-ethylmercapto)-4-ethylamino-6-isopropylamino-s-triazine,
2-(β-ethoxy-ethylmercapto)-4-diethylamino-6-isopropylamino-s-triazine,
2-(β-ethoxy-ethylmercapto)-4,6-bis-(γ-methoxy-propylamino)-s-triazine,
2-(β-ethoxy-ethylmercapto)-4,6-bis-(γ-isopropoxy-propylamino)-s-triazine,
2-(β-ethoxy-ethylmercapto)-4-ethylamino-6-(β-methoxy-ethylamino)-s-triazine and
2-(β-ethoxy-ethylmercapto)-4-ethylamino-6-isopropylamino-s-triazine
are obtained.

The following compounds are also obtained in an analogous manner:
2-(β-n-butoxy-ethylmercapto)-4-ethylamino-6-isopropylamino-s-triazine,
2-(ethoxy-ethoxyethylmercapto)-4-ethylamino-6-isopropylamino-s-triazine,
2-(ethoxyethoxyethylmercapto)-4-bis-isopropylamino-s-triazine,
2-(β-ethoxy-ethoxyethylmercapto)-4-isopropylamino-6-diethylamino-s-triazine and
2-(β-ethylmercapto-ethylmercapto)-4-ethylamino-6-isopropylamino-s-triazine.

*Example 22*

10 parts of 2-(β-methoxy-ethylmercapto)-4,6-bis-ethylamino-s-triazine and 90 parts of talcum can be ground in a ball mill. The mixture obtained serves as a dust. A pin beater mill or another mill may be used in place of the ball mill.

*Example 23*

20 parts of 2-(ethoxyethoxyethylmercapto)-4,6-bis-isopropylamino-s-triazine can be dissolved in a mixture of 48 parts of diacetone, 16 parts of xylene and 16 parts of an anhydrous polyethylene glycol ester of higher fatty acids. This concentrate can be diluted with water to form emulsions of any concentration desired.

*Example 24*

50–80 parts of 2-(β-methoxy-ethylmercapto)-4-ethylamino-6-isopropylamino-s-triazine can be mixed with 2–5 parts of a wetting agent i.e. a sulphuric acid ester of an alkyl polyethylene glycol ether, 1–5 parts of a protective colloid i.e. sulphite waste liquor and 14–44 parts of an inert solid carrier i.e. chalk and the mixture is then finely milled in a suitable mill. The wettable powder obtained can be stirred up with water and produces very stable suspensions.

Instead of chalk, kaolin, bentonite or kieselguhr may be employed.

*Example 25*

10 parts of 2-(β-ethoxy-ethylmercapto)-4,6-bis-ethylamino-s-triazine can be dissolved in 60–80 parts of a high boiling organic liquid i.e. coal tar oil, to which 30–10 parts of xylene have been added. It can be used as a spray. Diesel oil or spindle oil may be used in place of coal tar oil.

*Example 26*

5–10 parts of 2-(β-methoxy-ethylmercapto)-4-ethylamino-6-isopropylamino-s-triazine can be mixed and milled with 95–90 parts of calcium carbonate (=ground limestone). The product can be used as a sprinkling agent.

*Example 27*

95 parts of a granular carrier, i.e. sand are moistened with 1–5 parts of water, and then 5 parts of 2-(β-methoxy - ethylmercapto)-4-ethylamino-6-isopropylamino-s-triazine can be mixed in. Isopropanol or polyethylene glycol may be employed in place of water. Calcium carbonate is a suitable substitute for sand.

A greater amount, e.g. 100–900 parts of a possibly water soluble fertilizer such as e.g. ammonium sulphate or urea, can be mixed with the above mixture or with one containing more active ingredient, e.g. 10 parts of active ingredients and 90 parts of calcium carbonate. The granulates obtained can be sprinkled.

*Example 28*

50 parts of 2-(β-methoxy-ethylmercapto)-4,6-bis-ethylamino-s-triazine can be added to 45 parts of xylene and the whole is combined with 5 parts of Toximul 500. A concentrate for the preparation of emulsions which in water can be emulsified in any ratio desired, is obtained.

Example 29

10 parts of 2-methylthio-4-isopropylamino-6-(γ-methoxy-propylamino)-s-triazine and 90 parts of talcum are ground in a ball mill, a pin beater mill or another suitable mill. The mixture obtained serves as a herbicidal dust for the purposes set forth hereinbefore.

Example 30

20 parts of 2-methylthio-4-isopropylamino-6-(γ-methoxy-propylamino)-s-triazine, are dissolved in a mixture of 48 parts of diacetone alcohol, 16 parts of xylene and 16 parts of an anhydrous polyethylene glycol ester of higher fatty acids. This concentrate can be diluted with water to form herbicidally active emulsions of any concentration desired.

Example 31

50–80 parts of 2-methylthio-4-isopropylamino-6-(γ-methoxy-propylamino)-s-triazine are mixed with 2–5 parts of a wetting agent, e.g. a sulfuric acid ester of an alkyl polyethylene glycol ether, 1 to 5 parts of protective colloid, e.g. sulphite waste liquor and 14 to 44 parts of an inert solid carrier such as, e.g. kaolin, bentonite, chalk or kieselguhr and the mixture is then finely milled in a suitable mill. The wettable powder obtained can be stirred up with water and produces very stable suspensions.

Example 32

10 parts of 2-methylthio-4-isopropylamino-6-(γ-methoxy-propylamino)-s-triazine are dissolved in 60 to 80 parts of a high boiling organic liquid such as, e.g. coal tar oil, diesel oil or spindle oil to which 30 to 10 parts respectively, of xylene have been added. It can be used as a herbicidal spray for the purposes set forth hereinbefore.

Example 33

5 to 10 parts of 2-methylthio-4-isopropylamino-6-(γ-methoxy-propylamino)-s-triazine, are mixed and milled with 95–90 parts of calcium carbonate (=ground limestone). The product can be used as a strewing agent for the purposes set forth above.

Example 34

95 parts of a granular carrier, e.g. sand or calcium carbonate are moistened with 1 to 5 parts of water, isopropanol or polyethylene glycol and then 5 parts of the active ingredient used in Example 33, are mixed in.

A greater amount, e.g. 100 to 900 parts of a preferably water-soluble fertilizer such as, e.g. ammonium sulfate or urea, can be mixed with the above mixture or with one containing more active ingredient, e.g. 10 parts of the active ingredient and 90 parts of calcium carbonate. The granulates obtained can be strewed on to fields planted with wheat as a pre-emergence treatment as mentioned hereinbefore.

Example 35

50 parts of 2-methylthio-4-isopropylamino-6-(β-methoxy-ethylamino)-s-triazine, are added to 45 parts of xylene and the whole is combined with 5 parts of Toximul 500. A concentrate for the preparation of emulsions which in water can be emulsified in any ratio desired, is obtained.

We claim:

A method for controlling annual weeds in tomato fields which comprises applying to each square meter of a tomato-planted area to be controlled, at least about 0.1 gram of up to about 1 gram of 2-chloro-4-isopropylamino-6-(γ-methoxy-propylamino)-s-triazine, as exclusive herbicidal agent, thereby killing the major portion of the annual weeds in said area while leaving tomato plants therein substantially undamaged.

References Cited by the Examiner

UNITED STATES PATENTS

| | | | |
|---|---|---|---|
| 3,022,150 | 2/1962 | Weed | 71—2.5 |
| 3,037,853 | 6/1962 | Luckenbaugh | 71—2.5 |
| 3,152,882 | 10/1964 | Luckenbaugh | 71—2.5 |
| 3,157,486 | 11/1964 | Harrison et al. | 71—2.5 X |
| 3,185,561 | 5/1965 | Acker | 71—2.5 |
| 3,190,740 | 6/1965 | Walter | 71—2.5 X |

ELBERT L. ROBERTS, *Primary Examiner.*

J. O. THOMAS, *Assistant Examiner.*